United States Patent [19]

Brennan et al.

[11] Patent Number: 4,704,332
[45] Date of Patent: Nov. 3, 1987

[54] LIGHTWEIGHT FIBER REINFORCED HIGH TEMPERATURE STABLE GLASS-CERAMIC ABRADABLE SEAL

[75] Inventors: John J. Brennan, Portland; Richard C. Novak, Glastonbury, both of Conn.

[73] Assignee: United Technologies Corporation, Hartford, Conn.

[21] Appl. No.: 438,144

[22] Filed: Nov. 1, 1982

[51] Int. Cl.$^4$ .......................... B32B 5/16; B32B 9/04; B32B 17/06; F04D 29/08

[52] U.S. Cl. .................................... 428/428; 277/96; 277/96.2; 415/174; 418/178; 418/179; 428/446

[58] Field of Search ............... 415/174; 418/178, 179; 277/96, 96.2; 428/297, 432, 428, 446

[56] References Cited

U.S. PATENT DOCUMENTS

| | | | |
|---|---|---|---|
| 3,053,694 | 9/1962 | Daunt et al. | 415/174 |
| 4,247,249 | 1/1981 | Siemers | 277/96.2 |
| 4,263,367 | 4/1981 | Prewo | 428/297 X |
| 4,289,446 | 9/1981 | Wallace | 277/96.2 |

OTHER PUBLICATIONS

Rose et al.: "The Condensed Chemical Dictionary", Sixth Edition, Reinhold Publ. Corp., New York, 1961, p. 769.

*Primary Examiner*—Richard D. Lovering
*Attorney, Agent, or Firm*—Alan C. Cohen

[57] ABSTRACT

A composite material suitable for use as an abradable seal is described. The seal comprises a high temperature stable fiber reinforced glass or glass-ceramic matrix base having at least one layer of abradable ceramic material, plasma sprayed or bonded to it. The ceramic abradable layer has a working temperature up to at least 3000° F. (1648° C.) and is oxidatively stable. The abradable seal has particular utility in a gas turbine engine.

9 Claims, 2 Drawing Figures

LIGHTWEIGHT FIBER REINFORCED HIGH TEMPERATURE STABLE GLASS-CERAMIC ABRADABLE SEAL

DESCRIPTION

TECHNICAL FIELD

The field of art to which this invention pertains is multilayered composite articles and particularly, abradable seals.

BACKGROUND ART

It is known that the efficiency of a gas turbine engine is dependent upon the control of gas leakage between stages in both the compressor and turbine sections of the engine. Although the engine is typically designed and manufactured to very precise dimensional tolerances, it is necessary to provide a sufficient cold clearance between rotating elements and the surrounding assembly to accommodate the differential thermal growth between the parts as the engine assumes its normal operating temperature.

In order to maximize efficiency, it is common practice to utilize an abradable surface layer on a metallic substrate which would be placed such that the rotating member could penetrate into the abradable surface layer as a result of thermal and centrifugal expansion thereby providing what is essentially a zero clearance.

Typically the abradable surface layer is attached to a metallic substrate whose composition has certain inherent drawbacks. One problem is that the elements used in formulating the metal of the substrate have the potential of being unobtainable because of their scarcity or the instability of world markets. This is made even more critical when it is considered that the most common application for such seals is in the construction of jet engines, e.g. for military applications.

The commonly used metallic substrates also have a relatively high coefficient of thermal expansion compared to available abradable surface materials. Should this differential between the two materials be too great, delamination at the substrate/abradable surface layer interface may occur or the abradable surface layer may crack, either condition being deleterious to its function. This need for minimizing the differential in expansion coefficients of the two materials necessarily narrows the number of abradable material which may be successfully employed. This is especially true where the part is one of high precision and will be used in temperatures ranging from ambient to 3000° F. (1648° C.).

A further drawback to the metallic substrate is its susceptibility to oxidation. Since most abradable seals are used in the hostile environment of a jet engine, it is necessary that the seal not be adversely affected by oxidizing gases. Unfortunately, the metallic substrates that are best able to withstand such adverse conditions are special alloys containing critical elements and are relatively expensive. These alloys are also very heavy and weight is always a prime concern in the aviation industry, especially in times of increasing fuel costs.

Accordingly, what is needed in the art is an abradable seal with a substrate that has less dependency on critical elements, is lightweight and relatively non-oxidative and whose coefficient of thermal expansion allows for a greater variety of abradable surfaces thus facilitating seal design.

DISCLOSURE OF INVENTION

The present invention is directed to an abra-dable seal, particularly adapted for use in gas turbine engines. The seal is composed of an abradable sealing layer affixed to a high temperature stable substrate. The abradable sealing layer comprises a high temperature stable ceramic oxide. The substrate is a high temperature stable, lightweight, fiber reinforced glass or glass-ceramic having a relatively low coefficient of thermal expansion. The use of this fiber reinforced glass or glass-ceramic substrate in combination with the abradable seal layer results in a seal which is lightweight, non-metallic, non-oxidizable and is useful in environments having working temperatures of about 3000° F. (1648° C.), while the low coefficient of thermal expansion facilitates the seal designs.

The foregoing and other objects, features and advantages of the present invention will become more apparent from the following description of preferred embodiments and accompanying drawing.

BEST MODE FOR CARRYING OUT THE INVENTION

Figure 1:
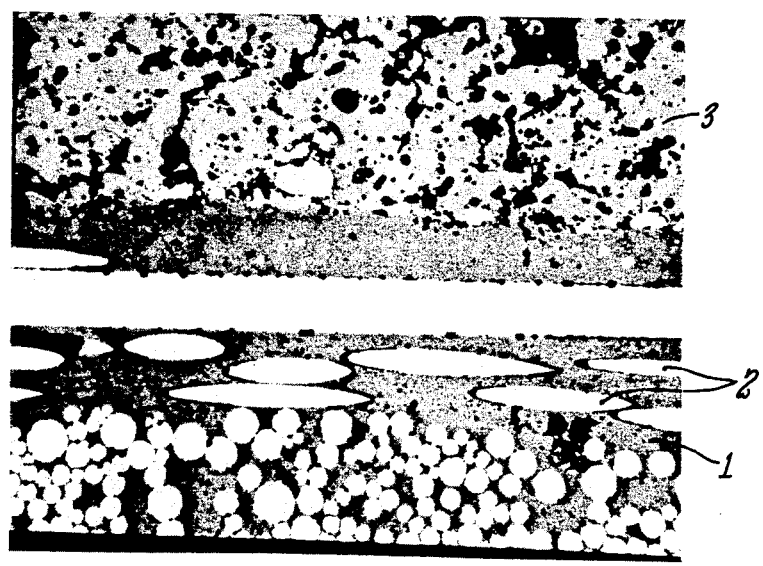
FIG. 1 is a photomicrograph of an abradable seal structure made according to the present invention.

The substrate portion of the seal is made up of a matrix material and reinforcing fibers. The preferred matrix material for the substrate is any glass-ceramic which is stable at high temperatures, e.g. temperatures in excess of 1000° C. Lithium aluminosilicate is a preferred glass-ceramic. Other conventional glass-ceramics such as aluminosilicate, magnesium aluminosilicate and combinations of the above can also be used. If the substrate temperatures can be kept below 1000° C., a glass matrix consisting of a high silica content glass, aluminosilicate, or borosilicate composition may be utilized. The glass or glass-ceramic matrix material should be titanium free, such as Corning #7740 borosilicate glass, available from Corning Glass Works. Note commonly assigned U.S. Pat. Nos. 4,314,852 and 4,324,843 the disclosures of which are incorporated by reference. If utilizing a glass-ceramic matrix material, it is preferred that the starting glass-ceramic material be obtained in the glassy state in powder form, preferably about −325 mesh. It is important to select a glass-ceramic matrix such as described above which can be densified (in combination with the reinforcing fibers) in the glassy state with a viscosity low enough to permit complete densification with subsequent transformation into substantially complete crystalline state, providing a composite with a use temperature in excess of 1000° C.

The fiber reinforcement for the glass or glass-ceramic matrix is a high temperature stable, oxidation resistant material and particularly silicon carbide fibers. While any silicon carbide fiber can be used, a multifilament yarn with an average filament diameter up to 50 microns is preferred and yarn with average filament diameter of 5–15 microns especially preferred. Nippon Carbon Company of Japan produces such a yarn with about 250 fibers per tow and an average fiber diameter of about 10 microns.

Several different techniques may be employed in making the desired substrate. The first comprises drawing a continuous length of reinforcing fiber through a slurry of glass powder mixed with a liquid binder, drying the impregnated fibers, in the form of a tape on a drum, and laying up the resulting fiber tape into a predetermined structural shape, and then hot pressing it into its final form, note U.S. Pat. Nos. 4,314,852 and 4,324,843 cited above.

Another method comprises preparing a mixture of glass powder and chopped fibers or whiskers at elevated temperatures and injecting this mixture into a mold of complex shape and then hot pressing into the final product. Note copending, common as U.S. patent application Ser. No. 381,805 filed May 25, 1982, now U.S. Pat. No. 4,464,192, the disclosure of which is incorporated by reference.

A third method comprises weaving the fibers or aligning them into a mold cavity in a particular shape or orientation, then introducing the glass matrix in molten form into the mold such that it surrounds and bonds the fibers. Note copending, commonly assigned U.S. patent application Ser. No. 381,801 filed May 25, 1982, now U.S. Pat. No. 4,428,763, the disclosure of which is incorporated by reference.

Any one of these methods (and any other suitable method) is satisfactory and the one selected depends on the particular properties desired of the final structure.

The abradable seal layer is a low density, oxidation resistant, relatively low coefficient of thermal expansion, high temperature stable ceramic oxide; which is penetrable by an abrading member. Typically, materials such as mullite or zirconium oxide are used.

Any method of securely affixing the abradable seal layer to the composite substrate can be used. Typically the seal layer is coated on the composite substrate by plasma spraying. Any commercially available plasma spraying equipment may be used. Optionally, it may be desirable to apply a bond coat to the composite substrate prior to application of the seal layer. This bond coat genrally comprises a layer of the matrix material of the substrate or a mixture of the matrix material of the substrate and the ceramic oxide material of the abradable seal layer. The proportion of the matrix material in this layer ranges from about 10% to about 100% by weight. This layer could also be applied by plasma spraying under similar conditions as the abradable seal material is applied.

An alternate method of creating the abradable seal layer is by plasma spraying a mixture of the glass or glass-ceramic matrix and abradable ceramic such that a graded layer of the desired thickness is produced. This graded layer comprises approximately 100% glass or glass-ceramic matrix nearest the substrate and gradually becomes 100% abradable ceramic away from the substrate. This may be accomplished using conventional plasma spraying techniques, equipment and art. Note commonly assigned U.S. Pat. No. 3,912,235 the disclosure of which is incorporated by reference.

Another method involves creating a similar graded composition using 100% mullite nearest the substrate, and gradually achieving 100% zirconium oxide at the abradable surface.

EXAMPLE

The composite abradable seal was prepared as follows:

A continuous tow of silicon carbide fiber was drawn through a slurry mixture of glass-ceramic solvent and binder. A typical composition used comprises 100 gm of powdered glass-ceramic, 200 ml of water, and 100 ml of a latex binder such as Rhoplex ® (Rohm and Haas, Philadelphia, Pa.). The wet tow was then wound around a drum, to form a tape, at a speed of 5 linear feet per minute. Excess glass-ceramic can be removed by pressing a squeegee against the drum as it winds. The thin impregnated tape was then dried at ambient temperature and heated at somewhat elevated temperatures to burn out the organic materials prior to hot-pressing.

After the tape was dried, it was removed from the drum and cut into strips to conform to the dimensions of the article to be fabricated. The tape strips were laid up in alternating ply stacks with each layer unidirectional, alternating plys of 0° and 90° orientation. (Although 0°, ±45°, ±30°, 30° -60°, etc. may be used). The assembled composite was then hot pressed either under vacuum or inert gas, i.e. argon, in graphite dies coated with colloidal boron nitride powder at pressures of 6.9–13.8 MPa (1000–2000 psi) and temperatures of 1100°–1550° C. Time of hot pressing will vary depending on composite makeup but generally will be accomplished between 10 minutes and 1 hour. After pressing, further heat treatment was utilized to convert the glassy matrix into a crystalline ceramic. In this instance, temperatures of 900° C. to 1000° C. for about 1 hour to about 24 hours were used.

The fibers utilized in these composites should have an average strength of approximately 2000 MPa (300 ksi) and a use temperature of up to 1500° C. If a yarn is selected it should have a density of approximately 2.6 gm/cc to about 2.7 gm/cc and an elastic modulus of approximately 180 GPa to about 220 GPa ($26 \times 10^6$ to $32 \times 10^6$ psi)

The abradable layer was a ceramic layer of zirconium oxide stabilized with yttrium oxide, consisting nominally of 80 wt % zirconium oxide ($ZrO_2$) and 20 wt % yttrium oxide ($Y_2O_3$). This material was applied to the substrate using conventional plasma spraying equipment, such as the Metco-7M plasma spray gun, with velocities of approximately three hundred feet per second. The abradable layer was applied to the substrate to a thickness of approximately 0.070 inch (0.1778 cm), althought thicknesses of from 0.020 inch to 0.200 inch (0.051 to 0.508 cm) are typically used.

FIG. 1 is a photomicrograph which shows a cross sectional view of an abradable seal structure made such as described in the Example. The configuration shows a matrix substrate with the fibers 2 in the 0°/90° mode and an abradable layer 3 affixed.

Figure 2:
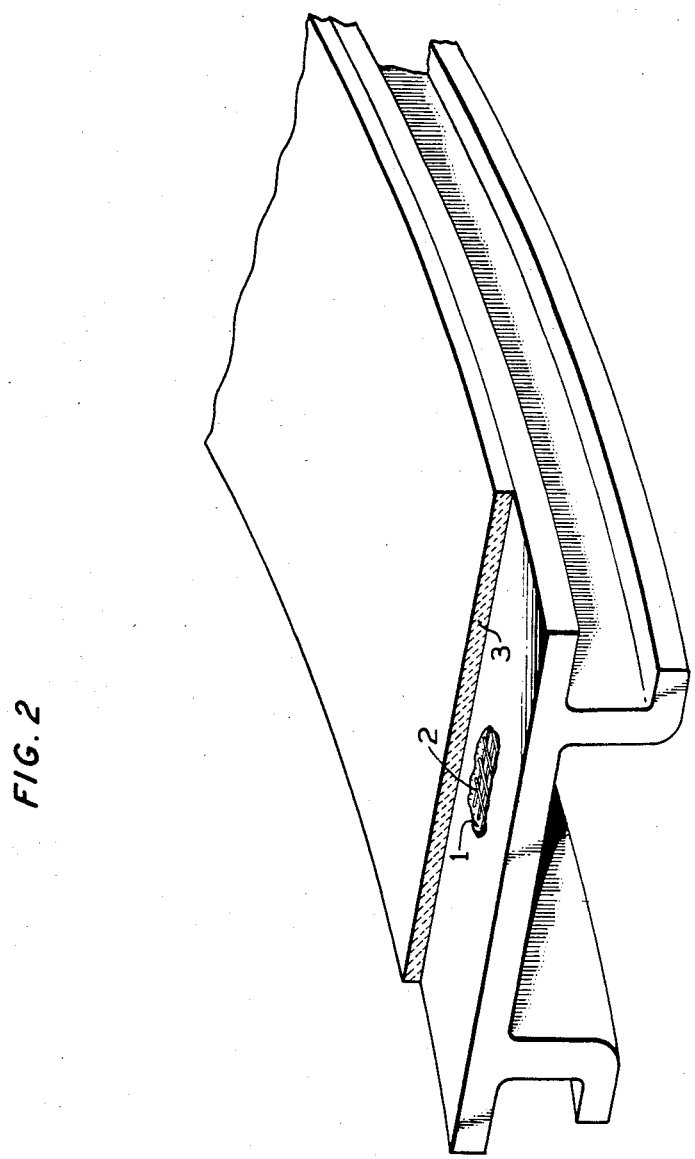
FIG. 2 illustrates an abradable seal useful for gas turbine engines, which may be manufactured utilizing the techniques and materials described harein.

FIG. 2 illustrates an abradable seal useful for gas turbine engines which may be manufactured using the aforementioned techniques. As in FIG. 1, the configuration shows a matrix substrate 1 with the fibers 2 in the 0°/90° mode and an abradable layer 3 affixed.

Although the invention has been shown and described with respect to a preferred embodiment thereof, it should be understood by those skilled in the art that various changes and omissions in the form and detail thereof may be made therein without departing from the spirit and the scope of the invention.

We claim:

1. An abradable seal comprising a high temperature stable silicon carbide fiber reinforced glass or glass-ceramic matrix base having at least one abradable ceramic layer thereon.

2. The abradable seal of claim 1 wherein the abradable ceramic layer is stable at temperatures up to about 3000° F. (1648° C.) and has a coefficient of thermal expansion up to three times that of the base material.

3. The abradable seal of claim 2 wherein the abradable ceramic layer has a coefficient of thermal expansion about two times that of the substrate.

4. The abradable seal of claim 1 wherein the matrix is a glass selected from the group consisting of aluminosilicate, borosilicate, high silica content glass and mixtures thereof.

5. The abradable seal of claim 1 wherein the matrix is a glass-ceramic selected from the group consisting of lithium aluminosilicate, magnesium aluminosilicate, aluminosilicate, and mixtures thereof.

6. The abradable seal of claim 1 wherein the abradable ceramic layer comprises mullite, zirconium oxide, or mixtures thereof.

7. The abradable seal of claim 6 wherein the abradable ceramic layer comprises a plurality of discrete layers of mullite and zirconium oxide.

8. The abradable seal of claim 6 wherein the abradable ceramic layer comprises a mixture of mullite and zirconium oxide in a graded layer increasing from 100% mullite to 100% zirconium oxide or vice versa.

9. The abradable seal of claim 1 wherein the abradable layer comprises a mixture of abradable ceramic and glass-ceramic matrix material in a graded layer increasing from 100% glass-ceramic matrix next to the base to 100% abradable ceramic away from the base.

* * * * *